(12) United States Patent
Nishioka et al.

(10) Patent No.: US 7,636,279 B2
(45) Date of Patent: Dec. 22, 2009

(54) OBJECTIVE LENS ACTUATOR AND OPTICAL PICKUP DEVICE HAVING THE SAME

(75) Inventors: Ken Nishioka, Osaka (JP); Hitoshi Fujii, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 491 days.

(21) Appl. No.: 11/712,487

(22) Filed: Mar. 1, 2007

(65) Prior Publication Data
US 2007/0206461 A1  Sep. 6, 2007

(30) Foreign Application Priority Data
Mar. 2, 2006  (JP) .............. 2006-056313

(51) Int. Cl.
*G11B 7/00* (2006.01)
(52) U.S. Cl. ................. 369/44.14; 369/44.22
(58) Field of Classification Search ........... None
See application file for complete search history.

(56) References Cited

U.S. PATENT DOCUMENTS

2003/0043707 A1* 3/2003 Jeong ............... 369/44.16
2003/0072244 A1* 4/2003 Matsui ............. 369/112.23
2004/0228230 A1* 11/2004 Matsui ............. 369/44.16

FOREIGN PATENT DOCUMENTS

| DE | 42 02 297 A1 | 8/1992 |
| DE | 199 51 862 A1 | 5/2001 |
| DE | 601 08 975 T2 | 12/2005 |
| DE | 603 13 085 T2 | 12/2007 |
| JP | A-06-251405 | 9/1994 |
| JP | A-2005-38527 | 2/2005 |

* cited by examiner

Primary Examiner—Paul Huber
(74) Attorney, Agent, or Firm—Morgan Lewis & Bockius LLP (57) ABSTRACT

An objective lens actuator is provided with an objective lens holder and a tilting coil that drives the objective lens holder in a tilting direction. The tilting coil is inclined with respect to the horizontal direction, so that a rotation center when the objective lens holder is driven in the tilting direction, is located on extension lines of sides that effectively contribute to driving the objective lens holder in the tilting direction by interaction between a magnetic field formed by a magnet and current that is supplied and flows in the coil among sides of the tilting coil.

13 Claims, 8 Drawing Sheets

OBJECTIVE LENS ACTUATOR AND OPTICAL PICKUP DEVICE HAVING THE SAME

This application is based on Japanese Patent Application No. 2006-056313 filed on Mar. 2, 2006, the contents of which are hereby incorporated by reference.

BACKGROUND OF THE INVENTION

1. Field of the Invention

The present invention relates to an optical pickup device that projects a light beam to an optical recording medium so that information can be read or written and an objective lens actuator that is provided to the optical pickup device. More specifically, the present invention relates to a structure of triaxial driving actuator that is capable of driving an objective lens in three directions.

2. Description of Related Art

Optical recording media including a compact disc (hereinafter referred to as a CD) and a digital versatile disc (hereinafter referred to as a DVD) are widely spread. Furthermore in recent years, for a purpose of increasing quantity of information on the optical recording medium, studies about high density recording on the optical recording medium have been performed. For example, a high density optical recording medium such as HD-DVD that is a high definition DVD and a Blu-Ray Disc (hereinafter referred to as a BD) are being available. When information is recorded or reproduced on such an optical recording medium, an optical pickup device is used, which projects a light beam to the optical recording medium so that information can be recorded or read.

The optical pickup device is provided with an objective lens actuator, so that an objective lens supported by a movable holder can move in a focus direction that is a direction perpendicular to a recording surface of the optical recording medium and a tracking direction that is a radial direction of the optical recording medium. Thus, focus adjustment and tracking adjustment are performed while a spot of the light beam projected to the optical recording medium via the objective lens can follow a recording track of the optical recording medium. Recently, as high density optical recording media have appeared, conditions for a light beam spot to follow the recording track have become strict. In particular, when the optical recording medium generates wobbling while it rotates, it is required to adjust an inclination of the objective lens.

Therefore, as described in JP-A-2005-38527 or JP-A-6-251405 for example, there is developed an objective lens actuator that is a so-called triaxial actuator capable of moving the movable holder not only in the focus direction and the tracking direction but also in a tilting direction that is a direction in which the objective lens is tilted. This triaxial actuator is provided with an objective lens, a fixed portion, and an objective lens holder that retains the objective lens and is supported by the fixed portion via flexible rod-like supporting members so as to be capable of moving in the focus direction, the tracking direction, and the tilting direction.

Figure 8A:
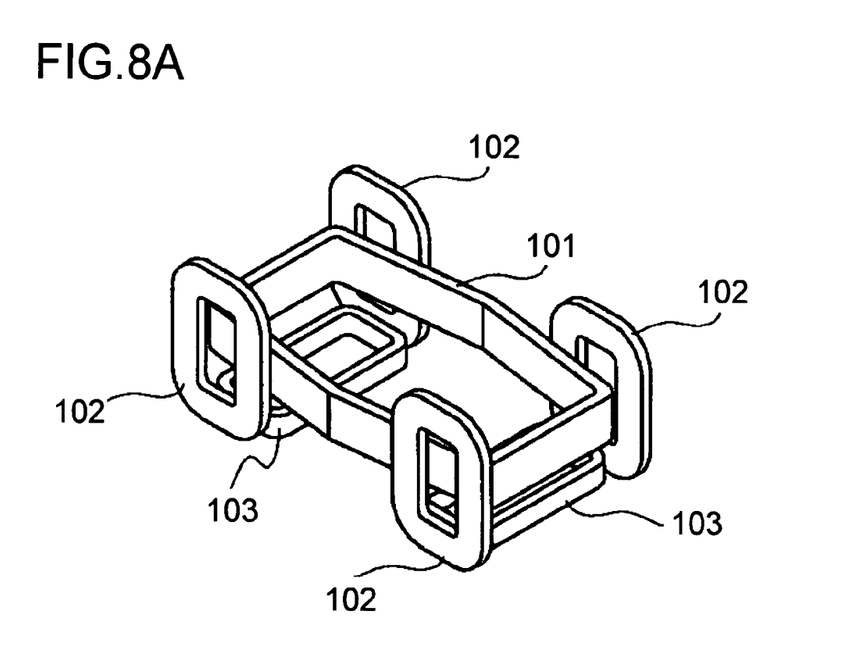
FIGS. 8A and 8B are diagrams to show a structure of a part of a conventional objective lens actuator.
Figure 8B:
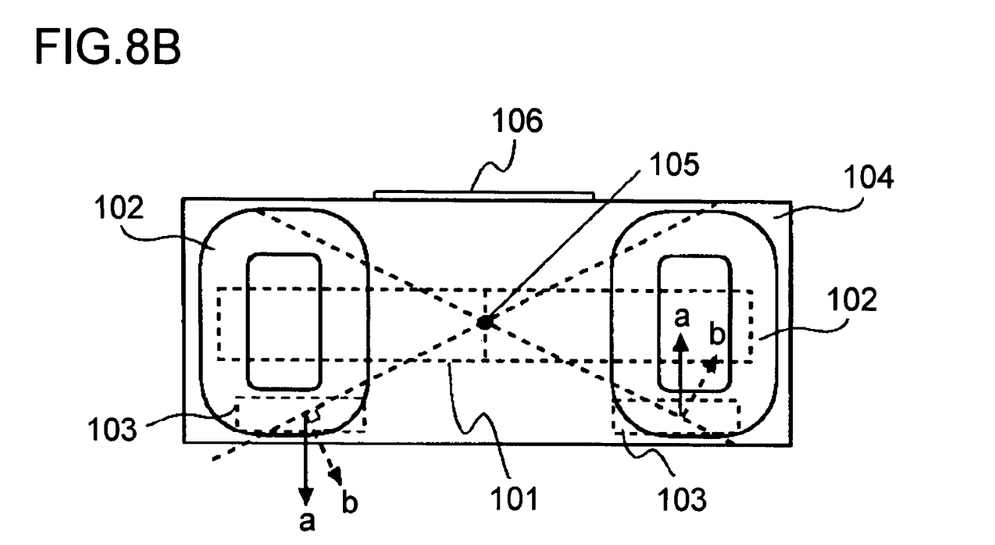

The movement of the objective lens holder in the focus direction, the tracking direction, and the tilting direction can be realized by electromagnetic actions between each of a focus coil, a tracking coil, and a tilting coil that are provided to the objective lens holder and a magnet disposed at a position opposed to them via the objective lens holder. FIGS. 8A and 8B are diagrams to show a structure of a part of a conventional triaxial actuator having the structure described above. FIG. 8A is a schematic perspective view to show a relationship among the focus coil, the tracking coil, and the tilting coil, and FIG. 8B is a schematic diagram of the objective lens holder when viewed from its side.

As shown in FIGS. 8A and 8B, a focus coil 101 is formed substantially in an elongated rectangular barrel shape and is disposed horizontally. The tracking coils 102 are formed substantially in a rectangular shape and are disposed at the outer peripheral side of the focus coil 101 in a separating manner horizontally at four sides. In addition, the tracking coil 102 is disposed in the direction substantially perpendicular to the focus coil 101. The tilting coils 103 are formed substantially in a rectangular shape and are disposed at the lower side of the focus coil 101 in a separating manner horizontally at the right and the left.

As shown in FIG. 8B, an objective lens holder 104 on which the objective lens 106 is mounted is moved by interaction with a magnet (not shown) in the focus direction that is the vertical direction when the focus coil 101 is supplied with current, in the tracking direction that is the right and left direction when the tracking coil 102 is supplied with current, and in the tilting direction that is a circumferential direction around an axis that passes through a rotation center 105 and is perpendicular to the paper when the tilting coil 103 is supplied with current. Then, by this movement in the three directions, the light beam spot can follow the recording track of the optical recording medium correctly.

However, studying about forces generated by the electromagnetic action in the focus coil 101, the tracking coil 102, and the tilting coil 103 of the objective lens actuator, it is understood that the direction of the force generated by electromagnetic action and the moving direction of the movable holder is the same as to the focus coil 101 and the tracking coil 102, but the direction "a" of the force generated in the tilting coil 103 is different from the moving direction b of the objective lens holder 104 (see FIG. 8B).

Therefore, the objective lens actuator of the conventional structure has a low utilization factor of the force generated in the tilting coil 103 and a low drive sensibility for tilting the objective lens, which means excessive power consumption. In addition, there is another problem caused by an undesired force generated in the tilting coil 103 in the direction other than the tilting direction, which is that the rotation center of the objective lens holder 104 is shifted so that the spot position of the light beam passing through the objective lens cannot follow the recording track of the optical recording medium correctly.

SUMMARY OF THE INVENTION

In view of the above described problems it is an object of the present invention to provide an objective lens actuator that is capable of moving an objective lens in the focus direction, the tracking direction, and the tilting direction, and that has improved drive sensibility in the tilting direction with a simple structure. And it is another object of the present invention to provide an optical pickup device that has improved quality in reading and writing an optical recording medium with low power consumption by being provided with the objective lens actuator described above.

To attain the above described first object an objective lens actuator in accordance with one aspect of the present invention is an objective lens actuator for enabling an objective lens holder that retains an objective lens to be driven to move in a focus direction that is an optical axis direction of the objective lens, a tracking direction that is a direction perpendicular to the focus direction, and a tilting direction that is a circumferential direction around an axis that is perpendicular to both the focus direction and the tracking direction. And the objective lens actuator is characterized by a structure in which the drive of the objective lens holder in the tilting direction is performed by interaction between a magnetic field formed by a magnet mounted on a base that constitutes the objective lens actuator and current that flows in at least one tilting coil provided to the objective lens holder, and the tilting coil is disposed so that a rotation center when the objective lens holder is driven in the tilting direction, is located on an extension line of a side of the tilting coil that effectively contributes to driving in the tilting direction by interaction with the magnetic field when current is supplied to the tilting coil among a plurality of sides of the tilting coil.

In addition, the present invention in accordance with another aspect is characterized by a structure in the objective lens actuator having the structure described above, in which the tilting coil is wound substantially in a rectangular shape.

In addition, the present invention in accordance with other aspect is characterized by a structure in the objective lens actuator having the structure described above, in which the side of the tilting coil that effectively contributes to driving in the tilting direction is disposed in a slanting manner with respect to the base.

In addition, the present invention in accordance with still other aspect is characterized by a structure in the objective lens actuator having the structure described above, in which a plurality of the tilting coils are disposed so that the same number of tilting coils are disposed at both sides with respect to the objective lens.

In addition, the present invention in accordance with still other aspect is characterized by a structure in the objective lens actuator having the structure described above, in which the objective lens holder is provided with a focus coil that is wound in the direction substantially parallel with the base so that the objective lens holder can be driven to move in the focus direction, and the tilting coil is disposed closer to the base than the focus coil is.

To attain the above described second object an optical pickup device in accordance with still another aspect of the present invention is equipped with the objective lens actuator according to claim 1.

According to the first structure of the present invention, the direction of the force generated in the tilting coil matches a tangential direction of a circle that is drawn when the objective lens holder rotates in the tilting direction. Therefore, the force generated in the tilting coil can be utilized effectively as a driving force for rotating the objective lens holder in the tilting direction, so that the drive sensibility of the objective lens actuator in the tilting direction can be improved. Thus, power consumption of the objective lens actuator can be reduced.

In addition, according to the second structure of the present invention, as to the objective lens actuator having the first structure described above, the objective lens actuator having the improved drive sensibility in the tilting direction can be a simple structure.

In addition, according to the third structure of the present invention, as to the objective lens actuator having the first or the second structure described above, the objective lens actuator having the improved drive sensibility in the tilting direction can be manufactured easily without concern for the relative position with the focus coil.

In addition, according to the fourth structure of the present invention, as to the objective lens actuator having any one of the first structure to the third structure described above, the objective lens actuator can be a simple structure easily since a right and left balance of the objective lens holder can be realized easily by disposing the same number of tilting coils with respect to the objective lens.

In addition, according to the fifth structure of the present invention, as to the objective lens actuator having any one of the first structure to the fourth structure described above, it is possible to realize a structure that is easy to keep a balance of the objective lens holder by the relative position with the objective lens having a large weight.

In addition, according to the sixth structure of the present invention, as to a optical pickup device including the objective lens actuator having any one of the first structure to the fifth structure described above, it is possible to save the power consumption which is required by whole optical pickup device because power consumption thereof becomes lower than that of the conventional objective lens actuator. And at the same time, because undesired force that was generated in the conventional structure for the rotation in tilting direction is almost nothing added to the objective lens holder different from the known structure when the objective lens actuator is driven in the tilting direction, it is possible stably to condense the spot of the light beam that is emitted from the light source on the recording track of the optical recording medium, as a result, quality of the recording on and reproducing from the optical recording medium can be maintained in good level.

DETAILED DESCRIPTION OF THE PREFERRED EMBODIMENTS

Now, an embodiment of the present invention will be described with reference to the attached drawings. It should be understood that the embodiment described below is merely an example, and the present invention is not limited to this embodiment.

Figure 1:
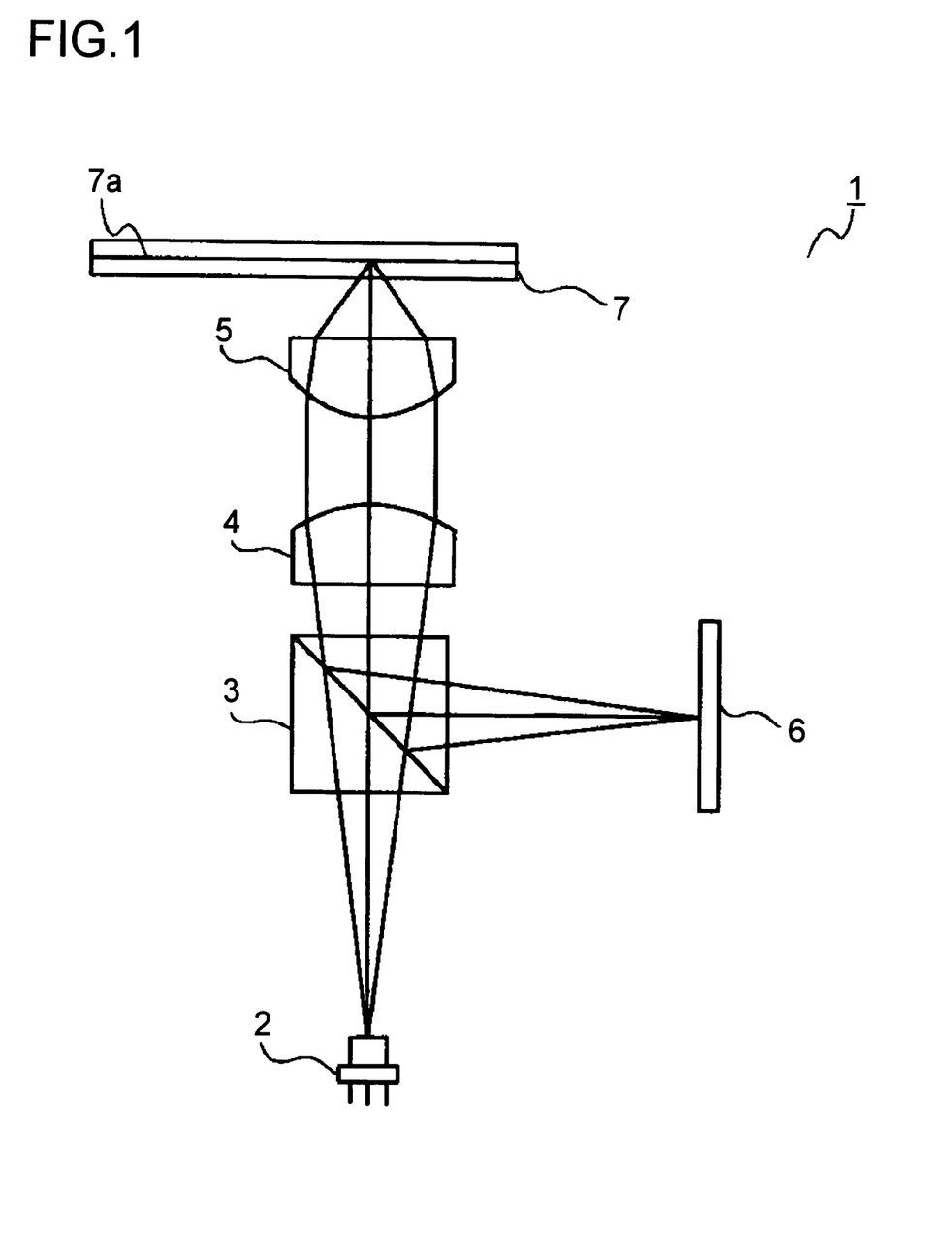
FIG. 1 is a schematic diagram to show a structure of an optical system of an optical pickup device according to the present embodiment.

FIG. 1 is a diagram to show an embodiment of an optical pickup device having the objective lens actuator according to the present invention, and it is a schematic diagram to show an optical system of the optical pickup device. In FIG. 1, numeral 1 denotes an optical pickup device that projects a light beam to an optical recording medium 7 such as a CD, a DVD, an HD-DVD, a BD, or the like and receives a reflection light from it for reading information recorded on a recording surface 7a of the optical recording medium 7. It also projects a light beam to the optical recording medium 7 for writing information on the recording surface 7a. The optical system of the this optical pickup device 1 is made up of a light source 2, a beam splitter 3, a collimator lens 4, an objective lens 5, and a photo detector 6, for example. Hereinafter, detail of each optical element will be described. At this point, the optical pickup device may have a structure in which other optical elements are added if necessary depending on a type or the like of the optical recording medium 7 that the optical pickup device 1 deals with.

The light source 2 is a semiconductor laser that emits a light beam having a wavelength corresponding to a type of the optical recording medium 7 that is read or written by the optical pickup device 1. The wavelength of the light beam emitted from the light source 2 is, for example, 780 nm if the optical pickup device 1 is for a CD, 650 nm for a DVD, and 405 nm for an HD-DVD and a BD. The light beam emitted from the light source 2, is sent to the beam splitter 3.

In the present embodiment, although the wavelength of the light beam emitted from the light source 2 is one type so that the optical pickup device supports only one type of optical recording medium 7, it should be understood that the present invention is not limited only to this structure. It is possible to adopt a structure of the optical pickup device in which a plurality of light sources having different wavelengths are disposed so as to support a plurality of types of optical recording media 7.

The beam splitter 3 works as a separation element for separating a light beam, and permits the light beam emitted from the light source 2 to pass through and leads the light beam to the optical recording medium 7, while it reflects the light beam that was reflected by the optical recording medium 7 and leads the light beam to the photo detector 6. The light beam that passed through the beam splitter 3 is sent to the collimator lens 4.

The collimator lens 4 is a lens for converting the light beam that passed through the beam splitter 3 into parallel rays. The term "parallel rays" mean light in which all the light rays emitted from the light source 2 have optical paths that are substantially parallel with the optical axis. The parallel rays that passed through the collimator lens 4 are sent to the objective lens 5.

The objective lens 5 condenses the light beam that passed through the collimator lens 4 on the recording surface 7a of the optical recording medium 7. As the objective lens 5, an appropriate one having an appropriate numerical aperture is used in accordance with a type of the optical recording medium 7 that is read and written by using the optical pickup device 1. For example, a numerical aperture of the objective lens 5 that is used for a CD is 0.50, that for a DVD and an HD-DVD is 0.65, and that for a BD is 0.85. In addition, the objective lens 5 is mounted on an objective lens actuator that will be described later and is adapted to be capable of moving in a predetermined direction by the objective lens actuator.

The reflection light reflected by the optical recording medium 7 passes through the objective lens 5 and the collimator lens 4, and then it reaches a light receiving portion (not shown) of the photo detector 6 after reflected by the beam splitter 3. The photo detector 6 converts the received light signal into an electric signal and supplies it to an RF amplifier or the like (not shown), for example. Then, this electric signal is used as a reproduction signal for reproducing information recorded on the recording surface 7a and is further used for generating a signal for servo control such as a focus error signal and a tracking error signal for performing focus control and tracking control.

Next, a structure of the objective lens actuator on which the objective lens 5 is mounted, will be described. The objective lens actuator of the present embodiment is capable of driving the objective lens 5 in a focus direction that is the optical axis direction thereof, a tracking direction that is a direction perpendicular to the focus direction (the radial direction of the optical recording medium 7), and a tilting direction that is a circumferential direction around an axis that is perpendicular to both the focus direction and the tracking direction. The objective lens actuator is a unit for a spot of the light beam that is emitted from the light source 2 and is condensed by the objective lens 5 to follow correctly a recording track (not shown) formed on the optical recording medium 7.

Figure 2:
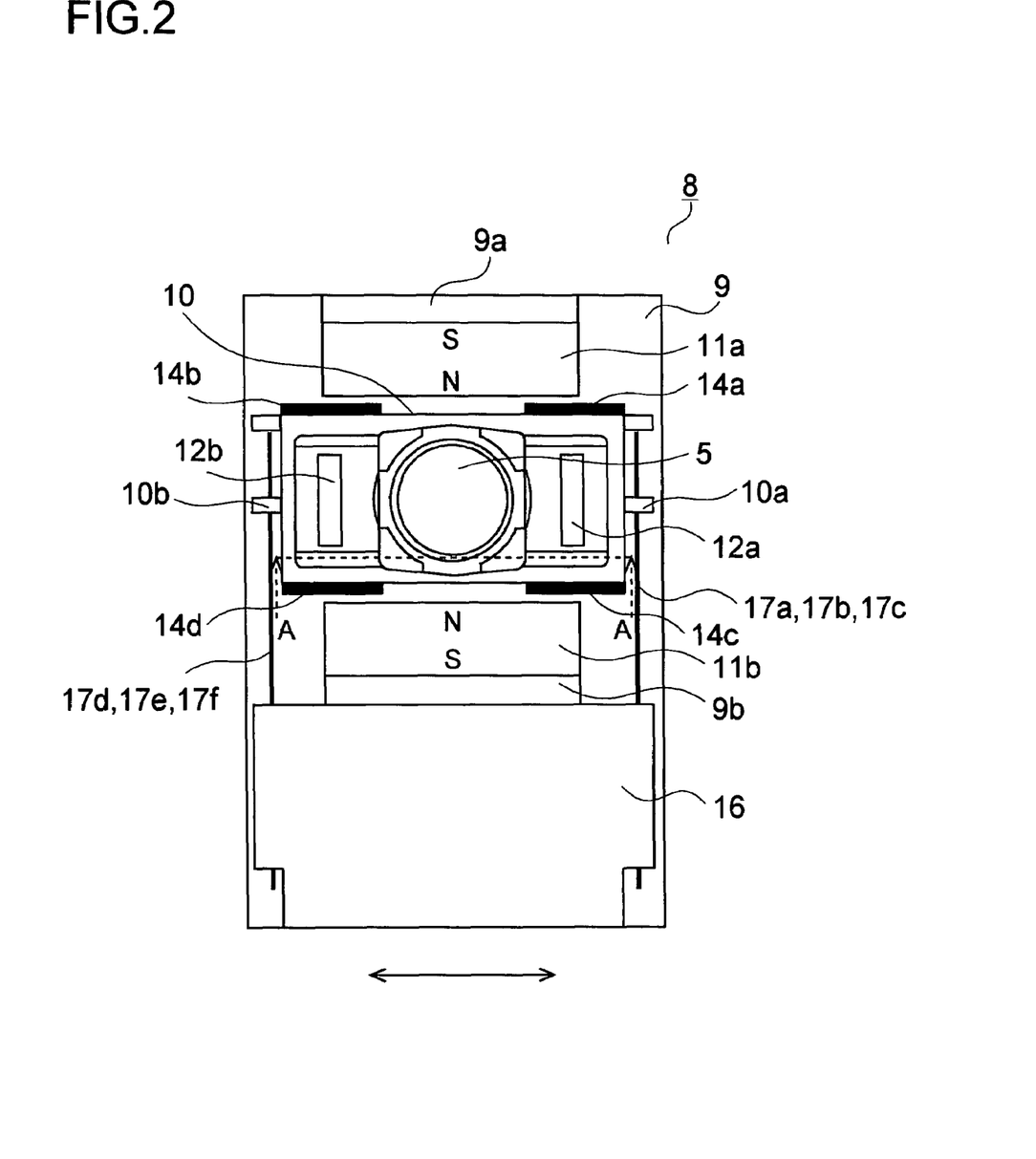
FIG. 2 is a schematic plan view of an objective lens actuator according to the present embodiment when viewed from the top.
Figure 3:
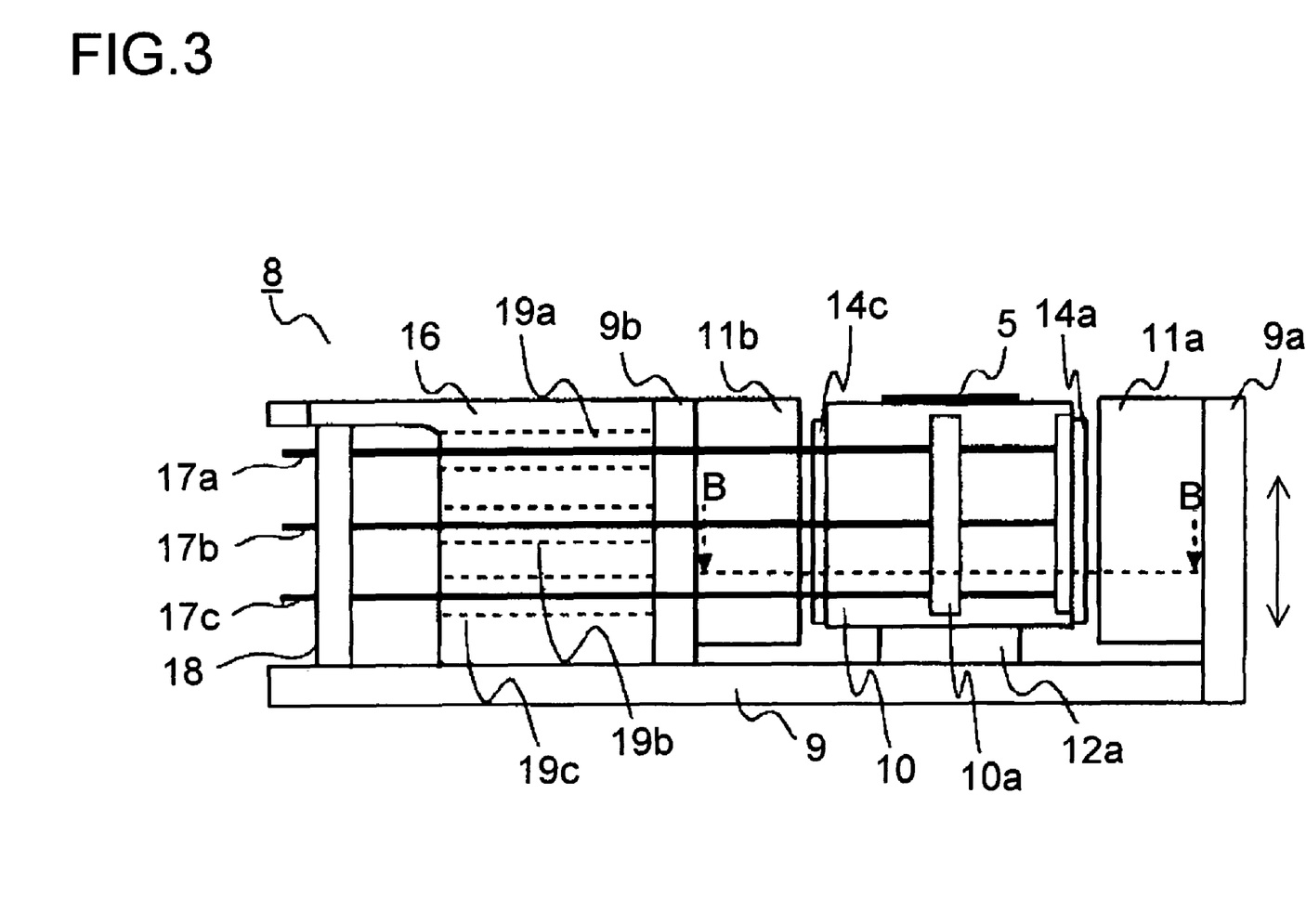
FIG. 3 is a schematic side view of the objective lens actuator according to the present embodiment when viewed from the right side in FIG. 2.

FIG. 2 is a schematic plan view of an objective lens actuator 8 of the present embodiment when viewed from the top, and FIG. 3 is a schematic plan view of the objective lens actuator 8 of the present embodiment when viewed from the right side in FIG. 2. Hereinafter, with reference to FIGS. 2 and 3 mainly, a structure of the objective lens actuator 8 will be described. At this point, the arrow shown in FIG. 2 indicates the tracking direction, and the arrow shown in FIG. 3 indicates the focus direction. As shown in FIGS. 2 and 3, the objective lens actuator 8 is mainly made up of a metallic base 9 having ferromagnetism, members mounted thereon, and an objective lens holder 10 that is a resin molding component.

The base 9 is provided with a through hole (not shown) for permitting a light beam emitted from the light source 2 (see FIG. 1) to pass through, and the objective lens holder 10 that will be described later in detail is disposed thereon. In addition, a pair of permanent magnets 11a and 11b are disposed to stand on the base 9 and are opposed to each other with a predetermined space so that the objective lens holder 10 is sandwiched between them. Each of the permanent magnets 11a and 11b is fixed to the base 9 in an integrated manner magnetically when outer faces of the permanent magnets are respectively attracted magnetically and fixed to the protrusions 9a and 9b that are shaped to bend from the base 9.

In the present embodiment, magnetic poles of the permanent magnets 11a and 11b are arranged to be the north pole on the side opposed to the objective lens holder 10 and the south pole on the side opposed to the protrusions 9a and 9b. At this point, the direction of the poles of the permanent magnets 11a and 11b are not limited to the structure of the present embodiment, and it may be the opposite direction.

In addition, a pair of yokes 12a and 12b are disposed to stand on the base 9 between the two permanent magnets 11a and 11b so that they face each other in the direction substantially perpendicular to the facing direction of the permanent magnets 11a and 11b. Each of the yokes 12a and 12b is shaped to bend from the base 9. At this point, the yokes 12a and 12b constitute a magnetic path, and more specifically, they have a role of improving drive efficiency of the objective lens holder 10 by effectively drawing magnetic fluxes from the permanent magnets 11a and 11b so that high density magnetic fluxes are given mainly to a focus coil, a tracking coil, and a tilting coil disposed between them, which will be described later.

Furthermore, a gel holder 16 that is a resin molding component made of polycarbonate or the like is fixed to the outer face side of the protrusion 9b to which one of the permanent magnet 11b is fixed magnetically on the base 9, and further a circuit board 18 is disposed to stand adjacently to the outside of the gel holder 16. One end of each of conductive wires 17a, 17b, 17c, 17d, 17e, and 17f is soldered and connected to the circuit board 18 on the right and the left sides at three positions each separated in the vertical direction. Each of these six wires 17a-17f passes through each of through holes 19a, 19b, 19c, 19d, 19e, and 19f formed in the gel holder 16 at positions corresponding to the connection to the circuit board 18, i.e., at the right and the left sides and at three positions each separated in the vertical direction.

More over, the wires 17a-17f are bonded to spines 10a and 10b protruding from the right and the left sides of the objective lens holder 10 by adhesive or the like, and thus the objective lens holder 10 is supported by the wires 17a-17f in a shakable manner with respect to the base 9. Then, the other ends of the wires 17a and 17d on the upper side are soldered and connected to a focus coil that will be described later, the other end of the wires 17b and 17e on the middle are soldered and connected to a tracking coil that will be described later, and other end of the wires 17c and 17f on the lower side are soldered and connected to a tilting coil that will be described later.

In addition, insides of the through holes 19a-19f of the gel holder 16, through which the wires 17a-17f pass, are filled with gel material whose main ingredient is silicone. At this point, the gel material is formed by injecting low-viscosity gel material (sol) into the through holes 19a-19f of the gel holder 16 and by irradiating it with ultraviolet rays a predetermined period of time so that the material is cured into a gel state. This gel holder 16 play a role of attenuating or suppressing vibration that is generated in each of the wires 17a-17f when the objective lens holder 10 is driven by the action of the magnetic forces.

The objective lens holder 10 has a plurality of coils that retain the objective lens 5 and further are movable itself by interaction with a magnetic field generated by the permanent magnets 11a and 11b. The objective lens 5 is retained by the objective lens holder 10 at the upper middle portion so that its optical axis matches the optical axis of the light beam emitted from the light source 2, and the objective lens holder 10 is formed to be hollow mainly so that the light beam from the light source 2 can enter the objective lens 5 and that the objective lens holder 10 can move easily. In addition, the yokes 12a and 12b that are disposed to stand on the base 9 are adapted to penetrate the objective lens holder 10.

Figure 4:
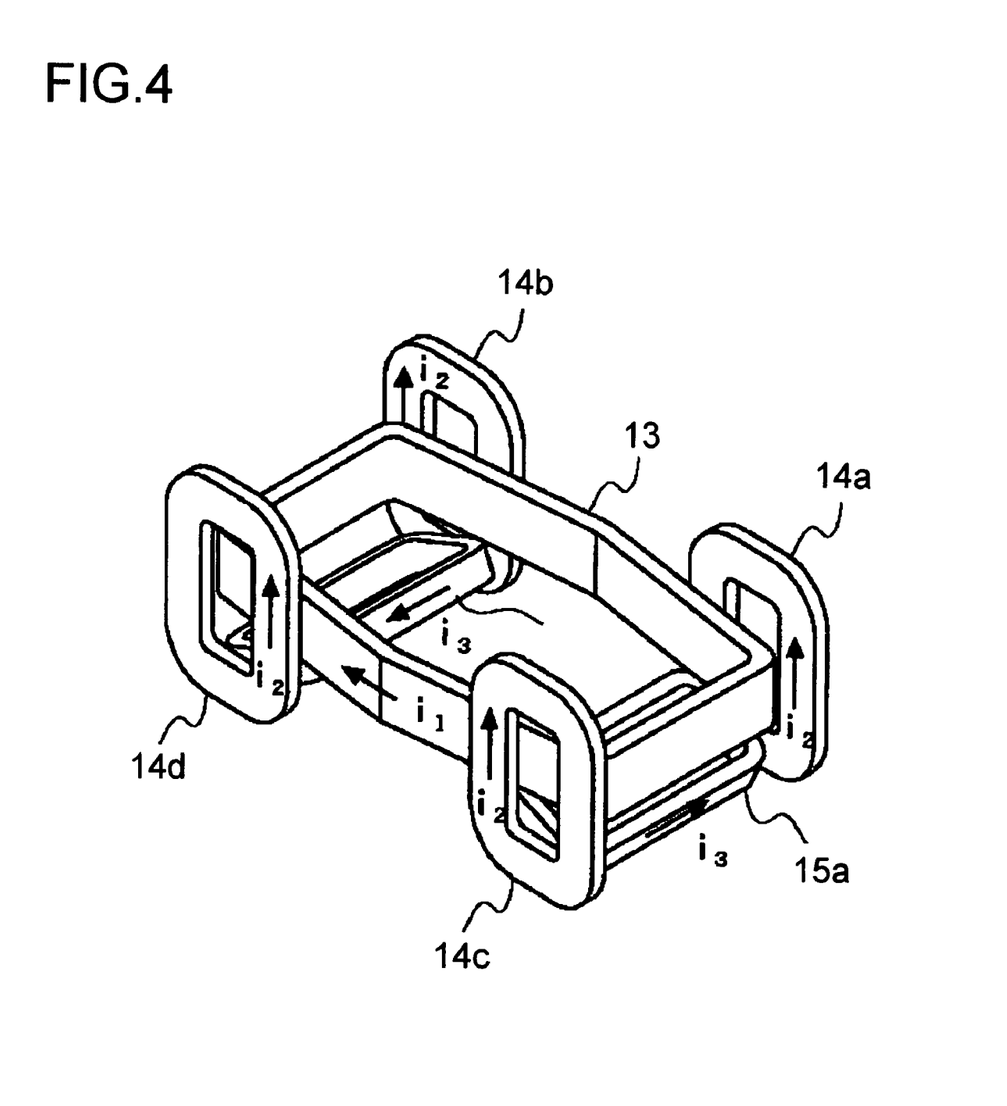
FIG. 4 is a schematic perspective view to show a structure of coils that are provided to an objective lens holder of the objective lens actuator.

FIG. 4 is a schematic perspective view to show a structure of the coils that are provided to the objective lens holder 10. Numeral 13 denotes a focus coil, and the objective lens holder 10 moves in the focus direction (see FIG. 3) when current is supplied to this coil. The focus coil 13 is wound substantially in a rectangular shape along the inner surface of the side wall of the objective lens holder 10 and is fixed to the objective lens holder 10 by adhesive or the like. When the focus coil 13 having this structure is supplied with current i1 in the direction as shown in FIG. 4 for example, the objective lens holder 10 moves downward in FIG. 3 by interaction between the current and the magnetic field generated by the permanent magnets 11a and 11b. In addition, when the focus coil 13 is supplied with current in the direction opposite to the current i1, the objective lens holder 10 moves upward in FIG. 3.

Numerals 14a-14d denote tracking coils, and the objective lens holder 10 moves in the tracking direction (see FIG. 2) when these coils are supplied with current. The tracking coils 14a-14d are disposed at the right and the left sides of the outer surface side one by one on each of two side walls that are opposed to the permanent magnets 11a and 11b among the side walls of the objective lens holder 10. Then, the tracking coil 14a and the tracking coil 14c, as well as the tracking coil 14b and the tracking coil 14d that are disposed on the opposed side walls and are disposed at positions facing each other sandwiching the objective lens holder 10. In addition, the tracking coils 14a-14d are wound and formed substantially in a rectangular shape, which is arranged substantially in parallel with the side walls of the objective lens holder 10 to which the tracking coils 14a-14d are provided. The tracking coils 14a-14d are connected in series by a wire as a whole, and each of them is fixed to the objective lens holder 10 by adhesive or the like.

When each of the tracking coils 14a-14d having this structure is supplied with current i2 in the direction as shown in FIG. 4 by the arrows for example, the objective lens holder 10 moves in the left direction in FIG. 2 by interaction between the current and the magnetic field generated by the permanent magnets 11a and 11b. In addition, when the tracking coils 14a-14d are supplied with current in the direction opposite to the current i2, the objective lens holder 10 moves in the right direction in FIG. 2.

Numerals 15a and 15b denote tilting coils, and the objective lens holder 10 moves (rotates) in the tilting direction when these coils are supplied with current. The tilting coils 15a and 15b are disposed at the lower side (the base 9 side) than the focus coil 13 and are wound substantially in a rectangular shape so as to encircle the yokes 12a and 12b, and they are fixed to the objective lens holder 10 by adhesive or the like. The tilting coils 15a and 15b are connected in series by a wire as a whole. However, the tilting coils 15a and 15b are not arranged horizontally with respect to the base 9 unlike the conventional tilting coil 103 shown in FIG. 8, but they are inclined with respect to the base 9. Hereafter, details of the arrangement of the tilting coils 15a and 15b in the objective lens holder 10 will be described with reference to FIGS. 5 and 6.

Figure 5:
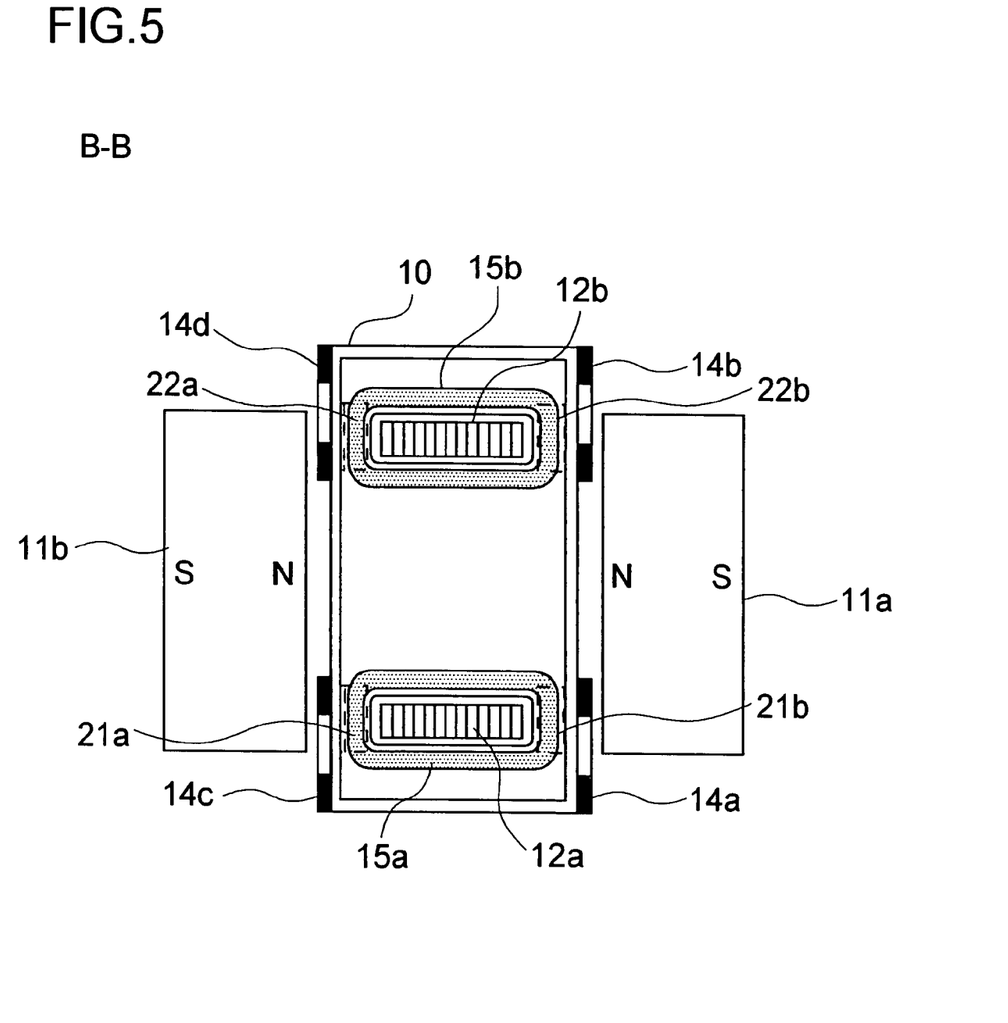
FIG. 5 is a cross sectional view when cut along the line B-B in FIG. 3.
Figure 6:
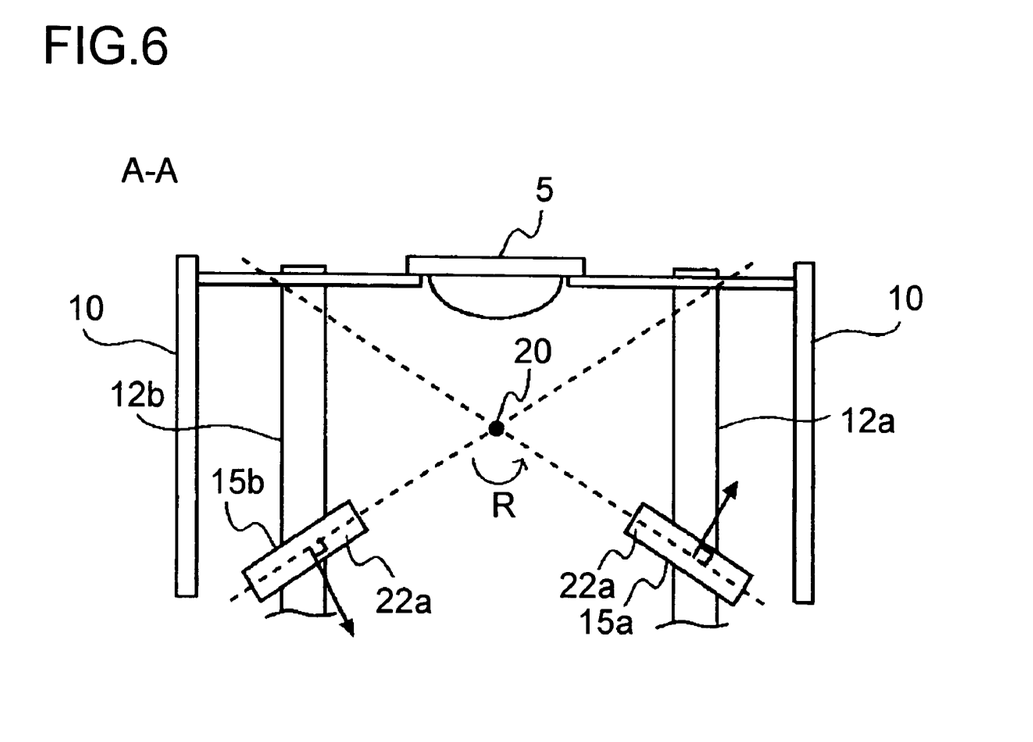
FIG. 6 is a cross sectional view when cut along the line A-A in FIG. 2.

FIG. 5 is a schematic cross sectional view of the objective lens holder 10 and the permanent magnets 11a and 11b when cut along the line B-B in FIG. 3, and FIG. 6 is a schematic cross sectional view of the objective lens holder 10 when cut along the line A-A in FIG. 2. Referring to FIG. 5, the sides 21a, 21b, 22a, and 22b enclosed by the rectangles of broken lines of the tilting coils 15a and 15b are substantially perpendicular to a direction of the magnetic field which is generated by the permanent magnets 11a and 11b. Therefore, when the tilting coils 15a and 15b are supplied with current, a large force due to the electromagnetic action is generated in the sides 21a, 21b, 22a, and 22b among all sides that constitute the tilting coils 15a and 15b. In other words, the sides 21a, 21b, 22a, and 22b correspond to the sides that effectively contribute to driving the objective lens holder 10 in the tilting direction among sides of the tilting coils 15a and 15b.

In addition, as shown in FIG. 6, the tilting coils 15a and 15b are disposed in an inclined manner with respect to the base 9 (from the horizontal direction) so that a rotation center 20 is located on extension lines of the sides 21a, 21b, 22a, and 22b when the objective lens holder 10 is rotated in the tilting direction. At this point, the sides 21b and 22b are not shown in FIG. 6, but the rotation center 20 is located also on extension lines of the sides 21b and 22b that are opposed to the sides 21a and 22a because the tilting coils 15a and 15b are formed substantially in a rectangular shape as described above.

The driving force of the objective lens holder 10 in the tilting direction is generated mainly by the electromagnetic action between current that flows in the sides 21a, 21b, 22a, and 22b and the magnetic field generated by the permanent magnets 11a and 11b as described above. In a case of the present embodiment, when the tilting coils 15a and 15b are supplied with current i3 flowing in the direction shown in FIG. 4 by the arrows for example, forces are generated in the tilting coils 15a and 15b as shown in FIG. 6 by the arrows (the arrows indicated on the tilting coils 15a and 15b) so that the objective lens holder 10 is rotated in the direction of the arrow R in FIG. 6. At this point, if the direction of the current that is supplied to the tilting coils 15a and 15b is reversed, the objective lens holder 10 will rotate in the direction opposite to the direction R.

Furthermore, in this case, the direction of the force generated when the tilting coils 15a and 15b are supplied with current is a tangential direction with respect to a circle that is drawn when the objective lens holder 10 rotates. Therefore, the force generated in the tilting coils 15a and 15b can be utilized effectively much more for rotating the objective lens holder 10 in the tilting direction compared with the conventional structure of the tilting coil 103 (see FIG. 8). Therefore, the objective lens actuator of the present embodiment can improve drive sensibility of tilting the objective lens holder 10, and power consumption thereof becomes lower than that of the conventional objective lens actuator.

It should be understood that the structure of the tilting coils 15a and 15b that are provided to the objective lens actuator 8 according to the present invention is not limited only to the structure of the present embodiment described above but can be modified variously within the scope of the present invention. For example, although each of the tilting coils 15a and 15b has a substantially rectangular shape in the present embodiment, this shape is not a limitation, and it is possible to adopt other shape if necessary, as long as the shape has a plurality of sides around which the coil is wound.

In addition, although two of the tilting coils 15a and 15b are provided to the objective lens actuator 8 in the present embodiment, the number thereof is not limited to two but can be any number such as one, or three or more. However, it is preferable to the dispose the same number of tilting coils on both sides with respect to the objective lens 5 because that keeping balance of the objective lens holder 10 is easy and that rotation of the objective lens holder in the tilting direction can be stabilized easily.

Figure 7A:
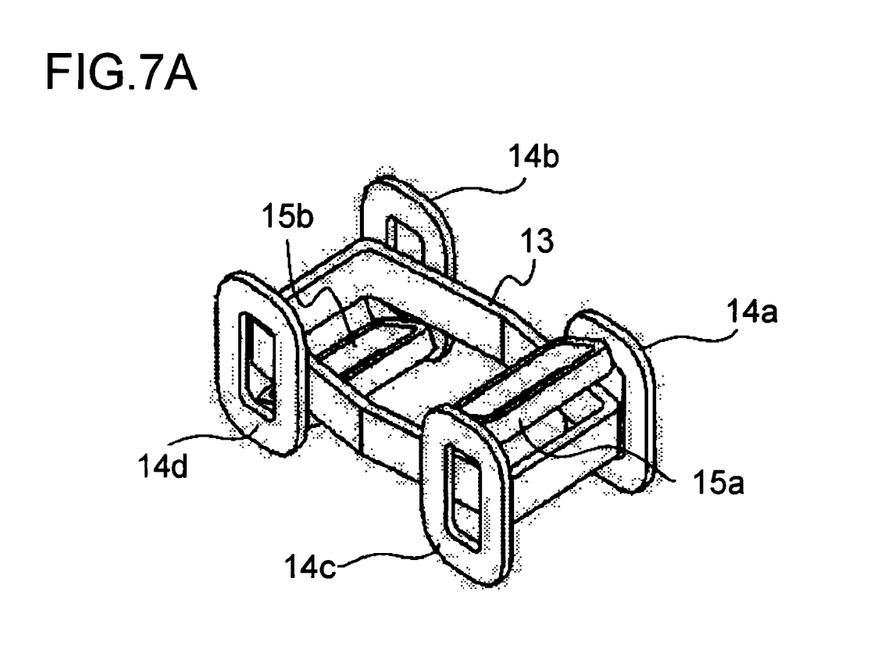
FIGS. 7A and 7B show a variation of the structure of the tilting coils that are provided to the objective lens actuator.
Figure 7B:
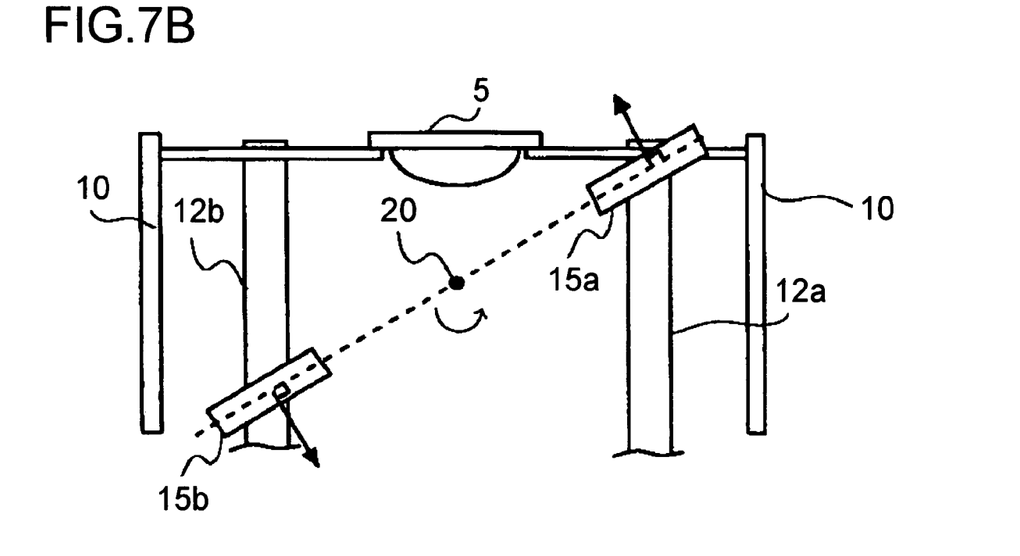

Furthermore, although the tilting coils 15a and 15b that are provided to the objective lens actuator 8 of the present embodiment are arranged at the lower side of the focus coil 13 (see FIG. 4), the arrangement thereof is not limited to this structure but can be other structure as shown in FIG. 7, for example. In this example, the tilting coil 15a is disposed at the upper side of the focus coil 13, and the tilting coil 15b is disposed at the lower side of the focus coil 13, so that the tilting coil 15a and the tilting coil 15b are arranged to be symmetric with respect to the rotation center 20 when the objective lens holder 10 rotates in the tilting direction. In this case too, the rotation center 20 is located on the extension line of the side that effectively contributes effectively to driving the objective lens holder 10 in the tilting direction among the sides of the tilting coils 15a and 15b when the objective lens holder 10 rotates in the tilting direction, so that the forces generated in the tilting coils 15a and 15b (shown in FIG. 7 by the arrows) can be utilized efficiently.

In addition, unlike the structure of the present embodiment in which the tilting coils 15a and 15b are inclined from the horizontal direction, it is possible to arrange the tilting coils 15a and 15b horizontally and to arrange the tilting coils so that the rotation center 20 is located on the extension line of the side that effectively contributes to driving the objective lens holder 10 in the tilting direction among the sides of the tilting coils 15a and 15b when the objective lens holder 10 rotates in the tilting direction. It is possible to adopt such a structure or the like.

According to the present invention, in the objective lens actuator (a triaxial actuator) that can move the objective lens holder retaining the objective lens in the focus direction, the tracking direction, and the tilting direction, tilting drive sensibility can be improved so that power consumption of the objective lens actuator can be reduced when the objective lens holder is driven in the tilting direction. In addition, since undesired force that was generated in the conventional structure can be reduced when the objective lens holder is driven in the tilting direction, the drive by the objective lens actuator in the tilting direction can be stabilized.

In addition, according to the present invention, since the optical pickup device is equipped with the objective lens actuator with reduced power consumption and stabilized drive in the tilting direction, the optical pickup device itself can be a low power consumption device and can condense the light beam that is emitted from the light source and passes through the objective lens on the recording track of the optical recording medium stably, which can maintain high quality in recording and reproducing information on the optical recording medium.

What is claimed is:

1. An objective lens actuator for enabling an objective lens holder that retains an objective lens to be driven to move in a focus direction that is an optical axis direction of the objective lens, a tracking direction that is a direction perpendicular to the focus direction, and a tilting direction that is a circumferential direction around an axis that is perpendicular to both the focus direction and the tracking direction, wherein the drive of the objective lens holder in the tilting direction is performed by interaction between a magnetic field formed by a magnet mounted on a base that constitutes the objective lens actuator and current that flows in at least one tilting coil provided to the objective lens holder, and the tilting coil is disposed so that a rotation center when the objective lens holder is driven in the tilting direction, is located on an extension line of a side of the tilting coil that effectively contributes to driving in the tilting direction by interaction with the magnetic field when current is supplied to the tilting coil among a plurality of sides of the tilting coil.

2. The objective lens actuator according to claim 1, wherein the tilting coil is wound substantially in a rectangular shape.

3. The objective lens actuator according to claim 1, wherein the side of the tilting coil that effectively contributes to driving in the tilting direction is disposed in a slanting manner with respect to the base.

4. The objective lens actuator according to claim 2, wherein the side of the tilting coil that effectively contributes to driving in the tilting direction is disposed in a slanting manner with respect to the base.

5. The objective lens actuator according to claim 1, wherein a plurality of the tilting coils are disposed so that the same number of tilting coils are disposed at both sides with respect to the objective lens.

6. The objective lens actuator according to claim 2, wherein a plurality of the tilting coils are disposed so that the same number of tilting coils are disposed at both sides with respect to the objective lens.

7. The objective lens actuator according to claim 3, wherein a plurality of the tilting coils are disposed so that the same number of tilting coils are disposed at both sides with respect to the objective lens.

8. The objective lens actuator according to claim 1, wherein the objective lens holder is provided with a focus coil that is wound in the direction substantially parallel with the base so that the objective lens holder can be driven to move in the focus direction, and the tilting coil is disposed closer to the base than the focus coil is.

9. The objective lens actuator according to claim 2, wherein the objective lens holder is provided with a focus coil that is wound in the direction substantially parallel with the base so that the objective lens holder can be driven to move in the focus direction, and the tilting coil is disposed closer to the base than the focus coil is.

10. The objective lens actuator according to claim 3, wherein the objective lens holder is provided with a focus coil that is wound in the direction substantially parallel with the base so that the objective lens holder can be driven to move in the focus direction, and the tilting coil is disposed closer to the base than the focus coil is.

11. The objective lens actuator according to claim 4, wherein the objective lens holder is provided with a focus coil that is wound in the direction substantially parallel with the base so that the objective lens holder can be driven to move in the focus direction, and the tilting coil is disposed closer to the base than the focus coil is.

12. An optical pickup device that is equipped with the objective lens actuator according to claim 1.

13. An optical pickup device that is equipped with the objective lens actuator according to claim 2.

* * * * *